Figure 6:
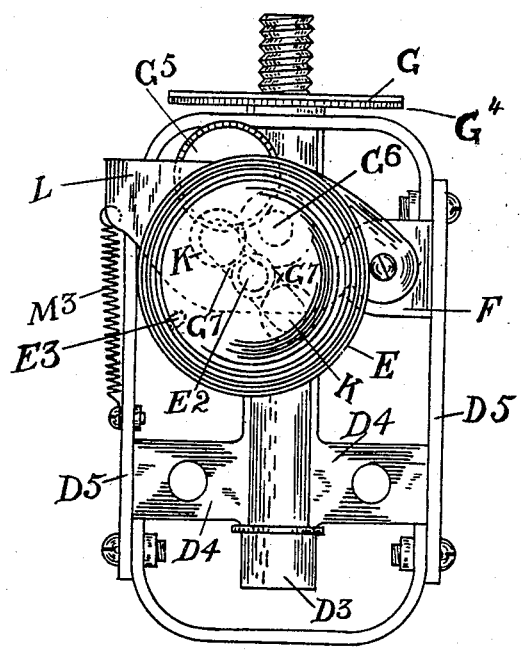

No. 616,893. Patented Jan. 3, 1899.
W. A. BUTLER.
BICYCLE BELL.
(Application filed July 1, 1897.)
(No Model.) 2 Sheets—Sheet 1.
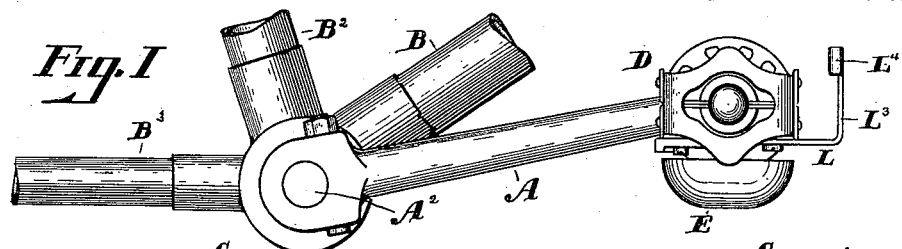
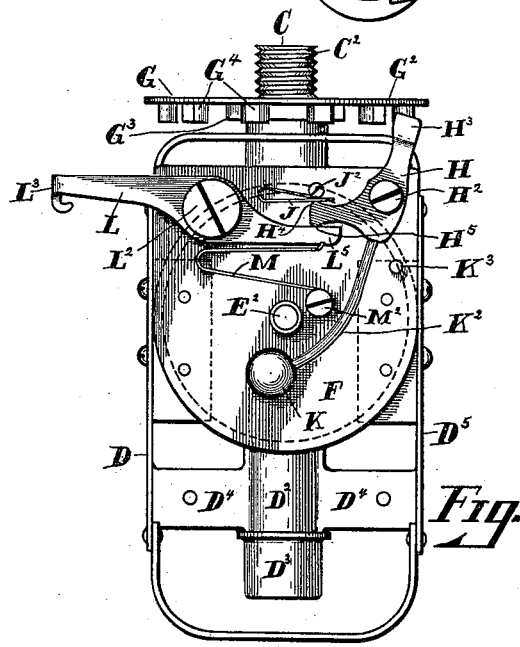
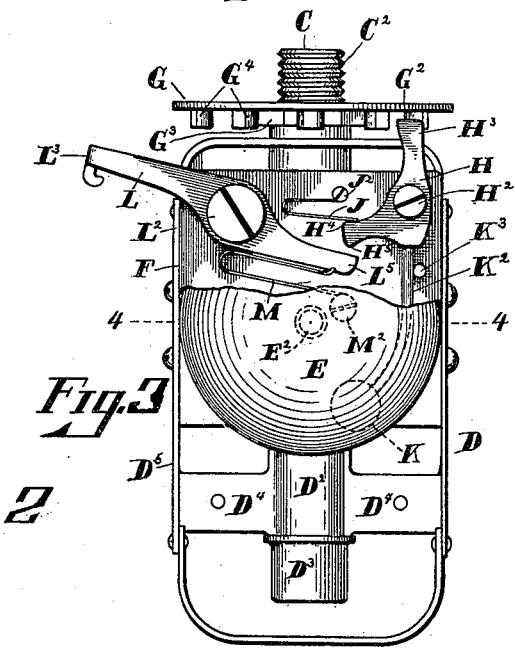
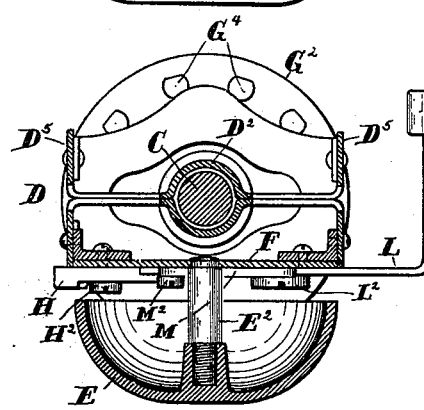
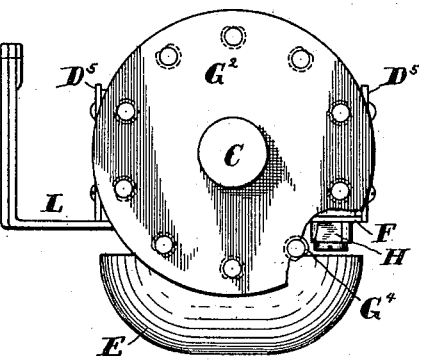
WITNESSES
Samuel A. West
K. Smith
INVENTOR
William A. Butler
per
Wm. Hubbell Fisher
Atty.

No. 616,893. Patented Jan. 3, 1899.
W. A. BUTLER.
BICYCLE BELL.
(Application filed July 1, 1897.)

(No Model.) 2 Sheets—Sheet 2.

Attest.
Wm. E. Jones
K. Smith

Inventor,
William A. Butler
per Wm. Hubbell Fisher
Atty.

UNITED STATES PATENT OFFICE.

WILLIAM A. BUTLER, OF CINCINNATI, OHIO, ASSIGNOR OF ONE-HALF TO GEORGE BUTLER, OF SAME PLACE.

BICYCLE-BELL.

SPECIFICATION forming part of Letters Patent No. 616,893, dated January 3, 1899.

Application filed July 1, 1897. Serial No. 643,161. (No model.)

*To all whom it may concern:*

Be it known that I, WILLIAM A. BUTLER, a citizen of the United States, and a resident of the city of Cincinnati, in the county of Hamilton and State of Ohio, have invented certain new and useful Improvements in Mechanism for Ringing Bells of Bicycles, of which the following is a specification.

The several features of my invention and the various advantages resulting from their use, conjointly or otherwise, will be apparent from the following specification and claims.

One of the primary features of my invention is the combination of a bell with the treadle of a bicycle and suitable means for enabling the foot of the rider to operate the bell.

Other features of my invention will hereinafter appear.

In the accompanying drawings, making a part of this specification, and in which similar letters of reference indicate corresponding parts, Figure 1 is an elevation of a crank-shaft and portions of the mechanism immediately connected therewith and also showing the treadle and the shaft and mechanism illustrating my invention applied thereto and combined therewith. Fig. 2 is a bottom view of the treadle, treadle-shaft, and the mechanism of my invention, the bell being removed to disclose the other parts and the mechanism being in position where the bell cannot be rung. Fig. 3 is a view similar to Fig. 2, with the exception that a part of the bell is shown and the mechanism is in position where the bell will be rung. Fig. 4 is a view, partly in section and partly in elevation, of the parts shown in Figs. 2 and 3, the section being a vertical transverse one and taken in the plane of the dotted line 4 4 of Fig. 2, that face of the section being seen which faces toward the lower end of the sheet. Fig. 5 is a view of that end of the device shown in Fig. 2 which faces toward the top of the figure, a part of the disk being broken away to disclose the form of the tripper, (foot of the bell-lever.) Fig. 6, Sheet 2, is a view similar to that shown in Fig. 3, but illustrating a modification of certain features of my invention.

A, Fig. 1, indicates the crank of the axle $A^2$, whereby the bicycle or similar vehicle is propelled. A portion of the other crank A is also seen in Fig. 1.

B, $B^2$, and $B^3$, respectively, indicate parts of a suitable frame. As the frame constitutes no part of my invention, further mention of same is hereby omitted.

D indicates the foot-treadle, made of any suitable form. A well-known form of such treadle is here shown and is as follows, to wit: Upon the arm C of the crank is a proper bearing or bearings $D^2$, provided with a removable cap $D^3$ or equivalent device at the end of the arm for shielding the latter from dirt. From the bearings extend lateral arms $D^4$, whose outer extremities support the sides $D^5$ of the treadle. The edges of these sides have suitable friction-teeth, and it is upon these that the foot of the operator (rider) rests when the vehicle is in motion.

The treadle supports a bell E, suitably secured to the frame of the treadle and at such a location as to be out of the way of the foot of the operator when using the treadle. In the present instance the bell is located below the treadle and is connected to a plate F, on which is located a mechanism adapted to be operated by the rotation of the crank and ring the bell. The preferred means of connecting the bell E to the plate F is a shank $E^2$, screwed into the bell. Fixed to the crank-web or crank-arm C, preferably to the latter, as shown, is the tripping device G, consisting, essentially, of one or more points or projections $G^4$, adapted to set in motion mechanism intervening between the tripping device and the bell, and thus cause the bell to be rung. A preferred arrangement of such tripping device is as shown, to wit: A disk $G^2$ is secured or otherwise firmly fixed on the crank-arm. To enable it to be readily screwed into or off from the arm C, a nut $G^3$ is fixed to or is integral with the plate $G^2$. The screw $C^2$ of the crank-arm is the one preferably utilized for this purpose.

On the plate $G^2$ are the tripping projections or studs $G^4$. A lever H, pivoted at $H^2$ to a plate F, has one end $H^3$ so arranged when it is advanced toward the tripping-studs $G^4$ that it will engage one at a time, and after being pressed away back by one stud it will slip off and advance in readiness to be struck by another stud $G^4$, and so on. This movement it (the lever) is compelled to make through the agency of the spring J, strained between point $H^4$ of the lever H and the stud $J^2$, fixed to the plate F. That end of the lever opposite to the end $H^3$ is fixed to the elastic arm $K^2$, carrying at its free end the hammer K. The backward movement of the arm $K^2$ and hammer K toward the bell is checked by a stud $K^3$, which checks the bell-arm $K^2$ (at the point where it strikes the stud) a little short of the distance it would normally go up to the point where the hammer strikes the bell. The hammer having acquired momentum in its movement toward the bell continues its movement by bending the elastic arm $K^2$, even though the latter has been stopped at one point of its length by the stud $K^3$, and it strikes the bell and then is brought back by the elasticity of the arm $K^2$ (straightening itself) to a position out of contact with the bell, leaving the latter free to ring without being muffled, as would be the case were the hammer to remain in contact with the bell, and thus interfere with the vibrations of the latter. This arrangement of stud $K^3$, to cause the hammer to leave the bell after impact with the latter, being old, no further mention will be made thereof.

A foot-lever L is pivotally fulcrumed at $L^2$ to the plate or frame F. At one end it carries the foot-shank $L^3$ and the foot-piece $L^4$, projecting above the plane of the treadle D and in position to be moved by a slight sidewise inclination of the toe of the operator. The other end $L^5$ of lever L is arranged to continually press against an angular projection $H^5$ of lever H, except when pressed away from said projection by the pressure of the operator's foot, as aforementioned.

The continual pressure of end $L^5$ of lever L against projection $H^5$ is caused by a spring of suitable form. One description of such spring M is shown in the drawings and consists of a piece of elastic metal flexed back on itself, its free end bearing against end $L^5$ and its other end connected to the stud $M^2$.

When the operator's foot is not pressing against the lever L $L^4$, the end $L^5$ presses against the lever H, and this spring M being stronger than the spring J forces the lever end $L^5$ to move the end $H^5$ of lever H and throw the end $H^3$ of the latter away from and out of engagement with the studs $G^4$. The bell is then silent.

When the operator desires to ring his bell, he moves his toe a little and so as to press the lever L out of engagement with lever H. Then the spring J reassumes its functions and draws the end $H^2$ of lever H into engagement with the rotating circle of studs G, (the vehicle being in motion,) and the bell-hammer is reciprocated with the oscillation of lever H, and the bell is continually rung until foot-pressure on lever $L^4$ L is withdrawn.

Various applications of my invention may obviously be made. One of such applications is indicated in Fig. 6, where the plate G is furnished with closely-recurring studs $G^4$ in the nature of a crown-wheel. There is also present a spur-wheel $G^5$ engaging a pinion $G^6$, whose shaft is provided with radiating arms $G^7$, arranged when the sleeve to which they are fixed is rotated to strike projections $E^3$ on the bell and ring the latter. The pivot of spur-wheel $G^5$ is fixed in the plate F, and the sleeve which carries the arms $G^7$ is rotatable on the shaft $E^2$, which carries the bell, and is likewise fixed to plate F. This latter plate is, in the present instance, pivoted to slide in an arcal direction and is connected to the foot-lever L, which is in this case pivoted at the end opposite where the toe projection $L^3$ is located. By pushing the lever L toward the crown-wheel G the spur-wheel $G^5$ is caused to engage it, and (as the vehicle moves) the arms $G^6$ are swung around and strike the bell and ring the latter. It will be understood that the arms are provided with yielding hammers. After pressure on the lever L is released a spiral spring $M^3$, attached at one end to this lever and at the other end to a fixed portion of the pedal, operates to retract this lever L and to disengage the latter from the crown-wheel $G^8$.

There are bells adapted to ring after the lever thereof has been pushed and pressure upon the same is released. Such bells could be operated in connection with the treadle by means of a movement of the foot by means substantially as suggested. Such a combination comes within one feature of my invention.

What I claim as new and of my invention, and desire to secure by Letters Patent, is—

1. The combination of the treadle, crank-arm, stud $G^4$ adapted to be moved by the crank, and a lever H, elastically drawn out of contact with said stud, and the pivoted lever L, adapted to be moved by the foot of the operator and for enabling lever H to move the means for ringing the bell, substantially as and for the purpose specified.

2. The combination of the treadle, crank-arm, stud $G^4$ adapted to be moved by the crank, and a lever H pivoted at $H^2$, and spring J operating on said lever, and lever L, having toe-piece, and pivoted at $L^2$, and a spring operating on said lever, the latter spring when not overcome by human agency, adapted to overcome the force of spring J and keep lever H out of engagement with the stud, and bell, and bell-hammer, substantially as and for the purpose specified.

3. The combination of the treadle, crank-arm, and a discal series of projections $G^4$, moved by the crank, and a lever H pivoted at $H^2$, and having at one end the toe projection, and a spring elastically pressing the other end of the lever against lever H, the latter lever pivoted at $H^2$, and having end $H^5$ for engagement with the lever L and its opposite end $H^2$ adapted to successively engage the series of studs, when permitted to do so, and spring J for drawing the lever's end H² toward the studs G⁴, and hammer-arm K² of hammer K and the bell, substantially as and for the purpose specified.

4. The combination of the treadle, crank-arm, gong, and a rotative device of the crank-arm, and means between the rotative device and the gong for enabling the latter to be rung by said device, and a lever elastically holding the said gong-ringing means out of operation, except when moved by human agency, substantially as and for the purposes specified.

5. The combination of the treadle, crank-arm, gong, rotative device of the crank-arm for operating a lever for ringing the bell, and a second or foot lever automatically keeping the gong-ringing mechanism out of engagement with the rotative device, except when moved by human agency, the first-named lever tending when relieved of the pressure of the foot-lever to complete the engagement of the rotative device, and the means for directly ringing the bell, the levers being in engagement except when the bell is ringing, substantially as and for the purposes specified.

WILLIAM A. BUTLER.

Attest:
WM. E. JONES,
K. SMITH.